US010887001B2

(12) United States Patent
Tofighbakhsh et al.

(10) Patent No.: US 10,887,001 B2
(45) Date of Patent: *Jan. 5, 2021

(54) MANAGEMENT OF MASSIVELY DISTRIBUTED INTERNET OF THINGS (IOT) GATEWAYS BASED ON SOFTWARE-DEFINED NETWORKING (SDN) VIA FLY-BY MASTER DRONES

(71) Applicant: AT&T Intellectual Property I, L.P., Atlanta, GA (US)

(72) Inventors: Mostafa Tofighbakhsh, Cupertino, CA (US); Bryan Lee Sullivan, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/851,662

(22) Filed: Apr. 17, 2020

(65) Prior Publication Data

US 2020/0252122 A1  Aug. 6, 2020

Related U.S. Application Data

(63) Continuation of application No. 16/264,362, filed on Jan. 31, 2019, now Pat. No. 10,659,144.

(51) Int. Cl.
*H04B 7/185* (2006.01)
*H04L 12/18* (2006.01)
(Continued)

(52) U.S. Cl.
CPC ....... *H04B 7/18504* (2013.01); *G08G 5/0069* (2013.01); *H04B 7/18506* (2013.01);
(Continued)

(58) Field of Classification Search
CPC ........... H04B 7/18504; H04B 7/18506; H04W 4/029; H04W 24/02; H04W 84/005;
(Continued)

(56) References Cited

U.S. PATENT DOCUMENTS 7,839,764 B2 * 11/2010 Jiang ................... H04L 43/0817
370/216
8,643,495 B2 2/2014 Lan et al.
(Continued)

FOREIGN PATENT DOCUMENTS

| CN | 107172166 A | 9/2017 |
| WO | 2018/117301 A1 | 6/2018 |
| WO | 2018/206592 A1 | 11/2018 |

OTHER PUBLICATIONS

Polo et al. "Design of a low-cost Wireless Sensor Network with UAV mobile node for agricultural applications" Computers and electronics in agriculture 119 (2015): 19-32.
(Continued)

*Primary Examiner* — William Nealon
(74) *Attorney, Agent, or Firm* — Amin, Turocy & Watson, LLP

(57) ABSTRACT

Massively distributed and low-cost Internet of things (IoT) gateways can be controlled by software-defined networking (SDN) protocols transferred via an autonomous mobile device (e.g., fly-by drone). The IoT gateways can comprise sensors that capture information that is transferred to the communication network via the autonomous mobile device. For example, the autonomous mobile device can wake the IoT gateways adaptively and perform data collection and/or configuration tasks. Further, the autonomous mobile device can deliver the collected data to network devices of the communication network and return for the next batch of IoT gateway data collections.

20 Claims, 14 Drawing Sheets

(51) Int. Cl.
*H04W 24/02* (2009.01)
*H04L 12/24* (2006.01)
*G08G 5/00* (2006.01)
*H04W 4/029* (2018.01)
*H04W 84/00* (2009.01)
*H04W 88/16* (2009.01)
*H04L 29/08* (2006.01)

(52) U.S. Cl.
CPC ............ *H04L 12/189* (2013.01); *H04L 41/20* (2013.01); *H04L 67/12* (2013.01); *H04L 67/34* (2013.01); *H04W 4/029* (2018.02); *H04W 24/02* (2013.01); *H04W 84/005* (2013.01); *H04W 88/16* (2013.01)

(58) Field of Classification Search
CPC ........ H04W 88/16; H04L 67/12; H04L 67/34; H04L 12/189; H04L 41/20; G08G 5/0069
USPC ........................................................ 455/431
See application file for complete search history.

(56) References Cited

U.S. PATENT DOCUMENTS

| | | | |
|---|---|---|---|
| 9,464,902 | B2 | 10/2016 | Isler et al. |
| 9,582,002 | B2 | 2/2017 | Cavender-bares |
| 9,745,060 | B2 | 8/2017 | O'connor et al. |
| 9,776,717 | B2 | 10/2017 | Spinelli et al. |
| 9,860,677 | B1* | 1/2018 | Agerstam ............... H04L 67/28 |
| 9,880,559 | B2 | 1/2018 | Putkonen et al. |
| 9,959,507 | B2 | 5/2018 | Mathur et al. |
| 9,960,933 | B2 | 5/2018 | Ghosh et al. |
| 9,998,320 | B2 | 6/2018 | Fargano et al. |
| 10,069,950 | B2 | 9/2018 | Kotecha et al. |
| 10,390,227 | B2* | 8/2019 | Bicket ................. H04L 63/0823 |
| 2007/0143043 | A1* | 6/2007 | Wafer ................... H02J 13/0075 702/58 |
| 2010/0085903 | A1* | 4/2010 | Pandey ................. H04W 40/02 370/311 |
| 2012/0054527 | A1* | 3/2012 | Pfeifer ................... G06F 11/203 713/340 |
| 2012/0271461 | A1 | 10/2012 | Spata |
| 2014/0024313 | A1* | 1/2014 | Campbell ............... G06Q 50/02 455/41.2 |
| 2016/0049824 | A1* | 2/2016 | Stein ....................... H02J 50/20 320/108 |
| 2016/0232794 | A1* | 8/2016 | Hafeez ................... G08G 5/0043 |
| 2016/0259932 | A1* | 9/2016 | Lakshmanan ........... G06F 21/44 |
| 2016/0379165 | A1 | 12/2016 | Moakley |
| 2017/0013062 | A1* | 1/2017 | Kim ..................... H04L 12/2825 |
| 2017/0019144 | A1* | 1/2017 | Malach ................... H04W 4/80 |
| 2017/0041231 | A1 | 2/2017 | Seed et al. |
| 2017/0078157 | A1 | 3/2017 | Zhang |
| 2017/0086428 | A1 | 3/2017 | Horton et al. |
| 2017/0127606 | A1 | 5/2017 | Horton |
| 2017/0127622 | A1 | 5/2017 | Hong |
| 2017/0170675 | A1 | 6/2017 | Ni Scanaill et al. |
| 2017/0195239 | A1 | 7/2017 | Starsinic et al. |
| 2017/0195641 | A1 | 7/2017 | Yang et al. |
| 2017/0207926 | A1 | 7/2017 | Gil et al. |
| 2017/0207956 | A1 | 7/2017 | Cabral et al. |
| 2017/0223723 | A1 | 8/2017 | Das et al. |
| 2017/0227965 | A1* | 8/2017 | Decenzo ............. H04L 12/2809 |
| 2017/0347283 | A1 | 11/2017 | Kodaypak |
| 2017/0372137 | A1 | 12/2017 | Kumar et al. |
| 2017/0374323 | A1 | 12/2017 | Gornik |
| 2018/0000025 | A1 | 1/2018 | He et al. |
| 2018/0062919 | A1 | 3/2018 | Justin et al. |
| 2018/0069933 | A1* | 3/2018 | Chandra ................ G01C 11/02 |
| 2018/0074499 | A1 | 3/2018 | Cantrell et al. |
| 2018/0117446 | A1 | 5/2018 | Tran et al. |
| 2018/0139726 | A1 | 5/2018 | Choi et al. |
| 2018/0158019 | A1 | 6/2018 | Vutukuri et al. |
| 2018/0184269 | A1 | 6/2018 | Christoval et al. |
| 2018/0199207 | A1 | 7/2018 | Zavesky et al. |
| 2018/0220476 | A1 | 8/2018 | Jung et al. |
| 2018/0262571 | A1 | 9/2018 | Akhtar |
| 2018/0276695 | A1 | 9/2018 | Dione |
| 2018/0279319 | A1 | 9/2018 | Yu et al. |
| 2018/0302853 | A1* | 10/2018 | Chandra ................ H04L 43/10 |
| 2018/0316416 | A1 | 11/2018 | Reis et al. |
| 2018/0324106 | A1 | 11/2018 | Billore et al. |
| 2018/0325014 | A1 | 11/2018 | Debbaut |
| 2018/0341533 | A1 | 11/2018 | Shanbhag et al. |
| 2019/0075459 | A1* | 3/2019 | Bicket ............... H04W 12/0609 |
| 2019/0372900 | A1 | 12/2019 | Chen et al. |
| 2019/0392328 | A1 | 12/2019 | Gil Bulacio et al. |

OTHER PUBLICATIONS

Tripicchio et al. "Towards smart farming and sustainable agriculture with drones" Intelligent Environments (IE), 2015 International Conference, IEEE, 2015.

Mahajan et al. "Drones for Normalized Difference Vegetation Index (NDVI), to Estimate Crop Health for Precision Agriculture: A Cheaper Alternative for Spatial Satellite Sensors" International Conference on Innovative Research in Agriculture, Food Science, Forestry, Horticulture, Aquaculture, Animal Sciences, Biodiversity, Ecological Sciences and Climate Change (AFHABEC-2016), At Jawaharlal Nehru University. 2017.

Murugan et al. "Development of an adaptive approach for precision agriculture monitoring with drone and satellite data" IEEE Journal of Selected Topics in Applied Earth Observations and Remote Sensing 10.12 (2017): 5322-5328.

Rokhmana, Catur. "The potential of UAV-based remote sensing for supporting precision agriculture in Indonesia" Procedia Environmental Sciences 24 (2015): 245-253.

Costa et al. "The use of unmanned aerial vehicles and wireless sensor network in agricultural applications" Geoscience and Remote Sensing Symposium (IGARSS), 2012 IEEE International, IEEE, 2012.

McKinnon, Tom. "Agricultural Drones: What Farmers Need to Know." 2016. Agribotix LLC. 9 pages.

Non-Final Office Action received for U.S. Appl. No. 16/264,362 dated Sep. 18, 2019, 48 pages.

Popescu et al. "A Collaborative UAV-WSN Network for Monitoring Large Areas" Sensors, 2018, 25 pages.

Non-Final Office Action received for U.S. Appl. No. 16/208,227 dated Feb. 24, 2020, 28 pages.

Final Office Action received for U.S. Appl. No. 16/208,227 dated Aug. 20, 2020, 19 pages.

* cited by examiner

MANAGEMENT OF MASSIVELY DISTRIBUTED INTERNET OF THINGS (IOT) GATEWAYS BASED ON SOFTWARE-DEFINED NETWORKING (SDN) VIA FLY-BY MASTER DRONES

RELATED APPLICATION

The subject patent application is a continuation of, and claims priority to, U.S. patent application Ser. No. 16/264,362 (now U.S. Pat. No. 10,659,144), filed Jan. 31. 2019, and entitled "MANAGEMENT OF MASSIVELY DISTRIBUTED INTERNET OF THINGS (IOT) GATEWAYS BASED ON SOFTWARE-DEFINED NETWORKING (SDN) VIA FLY-BY MASTER DRONES," the entirety of which application is hereby incorporated by reference herein.

TECHNICAL FIELD

The subject disclosure relates to wireless communications, e.g., management of massively distributed Internet of things (IoT) gateways based on software-defined networking (SDN) via fly-by master drones.

BACKGROUND

Internet of things (IoT) technology holds a great promise for the future of the global communications industry. As the number of connected devices that can establish connectivity with other devices and/or passive objects to exchange data continues to rise steadily, the IoT technology gains widespread proliferation in the information technology industry. With an anticipated projection of over 20 billion devices in the next few years, service providers, network providers and/or cloud providers will observe a net increase in their traffic handling capabilities. This can help the providers enable new IoT services tailored to targeted industry verticals. While there are several ongoing competitive developments in the IoT domain, some key areas where there is an immediate focus include smart agriculture, smart city, transportation and/or utility services, virtual and augmented reality, etc. Low power wide area networking technologies using third generation partnership project (3GPP) defined standards and their ongoing evolution towards fifth generation (5G) seem to provide a solid framework to support such massive IoT initiatives.

Typically, remote areas with limited network coverage or without network coverage cannot leverage these services. Offering IoT services in such regions can create new challenges for network providers.

The above-described background relating to mobility networks is merely intended to provide a contextual overview of some current issues and is not intended to be exhaustive. Other contextual information may become further apparent upon review of the following detailed description.

DETAILED DESCRIPTION

Figure 1:
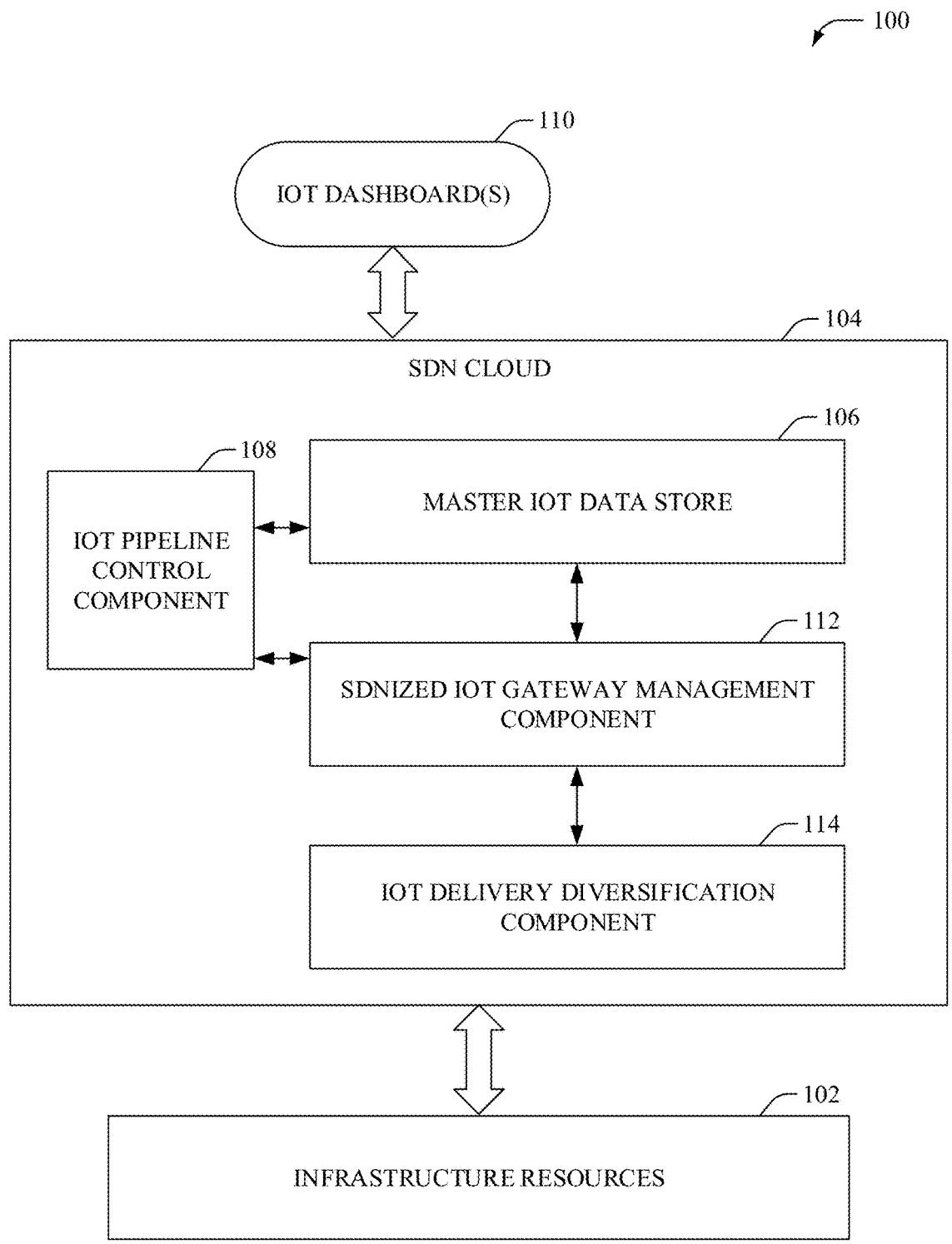
FIG. 1 illustrates an example system that depicts a high-level network architecture that facilitates data analytics for Internet of things (IoT) fields.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Terms like "user equipment" or similar terminology, refer to a wired or wireless communication-capable device utilized by a subscriber or user of a wired or wireless communication service to receive or convey data, control, voice, video, sound, gaming, or substantially any data-stream or signaling-stream. Data and signaling streams can be packetized or frame-based flows. Further, the terms "user," "subscriber," "consumer," "customer," and the like are employed interchangeably throughout the subject specification, unless context warrants particular distinction(s) among the terms. It should be noted that such terms can refer to human entities or automated components supported through artificial intelligence (e.g., a capacity to make inference based on complex mathematical formalisms), which can provide simulated vision, sound recognition and so forth.

Furthermore, it is noted that the term "cloud" as used herein can refer to a set of servers, communicatively and/or operatively coupled to each other, that host a set of applications utilized for servicing user requests. In general, the cloud computing resources can communicate with user devices via most any wired and/or wireless communication network to provide access to services that are based in the cloud and not stored locally (e.g., on the user device). A typical cloud computing environment can include multiple layers, aggregated together, that interact with each other to provide resources for end-users.

Aspects or features of the disclosed subject matter can be exploited in substantially any wired or wireless communication technology; e.g., universal mobile telecommunications system (UMTS), Wi-Fi, worldwide interoperability for microwave access (WiMAX), general packet radio service (GPRS), enhanced GPRS, third generation partnership project (3GPP) long term evolution (LTE), fifth generation (5G) or other next generation networks, third generation partnership project 2 (3GPP2) ultra mobile broadband (UMB), high speed packet access (HSPA), Zigbee, or another IEEE 802.XX technology, low power wide area (LPWA) and/or non-3GPP standard based solutions, such as, but not limited to, Ingenu, Sigfox, and/or LoRa, etc. Additionally, substantially all aspects of the disclosed subject matter can be exploited in legacy (e.g., wireline) telecommunication technologies.

Internet of things (IoT), which is the future of internet connectivity, enables creation of an information rich ecosystem that can enrich modern connected way of life and transform the way in which businesses as well as consumers function today. Typically, IoT/machine-to-machine (M2M) devices have different characteristics than regular/commercial user equipment (UEs) (e.g., non-IoT devices, such as, but not limited to, smart phones, tablet computers, personal computers, etc.). For example, the IoT/M2M devices collectively generate a much greater number of signaling connections in the mobile core network as compared to regular UEs. Further, in another example, the service/application provider often performs simultaneous device triggering and monitoring for targeted IoT applications and services. In addition, the IoT/M2M devices operate in a low-power/sleep mode for longer durations (e.g., 99% of the time) as compared to conventional non-IoT devices.

As a variety of IoT device categories emerge based on 3GPP standards evolution supporting a multitude of services, there is an increasing demand on the various network functions within the mobility infrastructure to be more intelligent, dynamic, adaptive, and flexible with their interworking to provide the best possible node level functions and end-to-end service behaviors. The systems and methods disclosed herein can provide various embodiments that provide low-cost delivery of IoT services, for example, in areas that do not have network coverage (e.g., cellular coverage, Wi-Fi coverage, etc.), via massively distributed IoT gateway devices and fly-by drones. For example, multiple IoT gateway devices (e.g., also referred to as IoT agents and/or IoT gateways) can be operated under the control of fly-by drones (e.g., unmanned aerial vehicle). In one aspect, the drones can wake up one or more IoT gateway devices, receive data (e.g., environmental data) collected by the one or more IoT gateway devices, and fly to the nearest connected mobility cloud network (e.g., 3G, 4G, 5G network, etc.) to transfer the collected data to a software-defined networking (SDN) network for further processing. Further, the embodiments disclosed herein describe a low-power protocol that can be utilized to communicate between the drones and IoT gateway devices.

Referring initially to FIG. 1, there illustrated is an example system 100 that depicts a high-level network architecture that facilitates data analytics for IoT fields, according to one or more aspects of the disclosed subject matter. Typically, system 100 can provide a cost-efficient approach to deliver network connectivity to enable IoT services, for example, within remote areas that do not have (or have very limited) network coverage. As an example, infrastructure resources 102 can comprise low-cost IoT gateways that are distributed across a large area (e.g., farm) and one or more autonomous and/or automated vehicles (e.g., drone, self driving car, etc.) that can be utilized to transfer data between the IoT gateways and a SDN cloud 104. As an example, system 100 can be employed for various IoT applications, such as, but not limited to, agriculture, smart cities, wildlife and/or environmental research, smart manufacturing and/or industrial automation, energy, security, FirstNet, healthcare, etc.

In an aspect, a master IoT data store 106 can receive and store data collected from the IoT gateways via the autonomous and/or automated vehicles. An IoT pipeline control component 108 can analyze the stored data (e.g., using Big data analysis) to manage execution of various pipelines related to IoT services. In one example, the IoT services can enable operations, such as, but not limited to, monitoring sensor data, creating alerts and/or notifying appropriate personnel (e.g., via dashboard(s) 110), controlling and/or managing tasks (e.g., that can be performed by the drone, the IoT gateway, and/or other connected controller devices), etc. As an example, an SDN-ized IoT gateway management component 112 can comprise vehicle management components (e.g., drone controller) that can utilize defined drone behavior and policy data (e.g., user defined policy and/or operator-defined policy) specified by the IoT delivery diversification component 114 to enable the IoT services.

In one example embodiment, system 100 can be utilized in the agricultural sector, where farms/fields span large areas (e.g., hundred to thousands of acres) that typically do not have network connectivity. Moreover, conventional agriculture fields lack low-cost automation and optimization. Given the large areas that are sparsely populated and/or remote, they typically lack network connectivity and power. Manually operating sensors distributed across just fields can be extremely tedious and time consuming. In contrast, system 100 can provide IoT technologies that are programmable and under control of a SDN to enable economy of scale. In this example embodiment, massively distributed IoT gateways comprising and/or coupled to one or more sensors (e.g., environmental sensor) can be deployed across the field/farm. Moreover, the IoT gateways can comprise mobile network operator (MNO)-certified gateways that can be self-installed, powered by solar energy, and operate under control of a IoT SDN cloud on boarded by one or more fly-by drones. For example, the drone(s) empowered by SDN protocols (e.g., broadcast, multicast, unicast, etc.) can wake/trigger the IoT gateways adaptively and can perform data collection and/or configuration tasks (e.g., defined by the SDN cloud 104) while flying in close proximity to the IoT gateways (e.g., approximately less the 300-400 meters above the IoT gateways). The drone(s) can then deliver the collected data to a nearby communication network (e.g., mobility network) and return for the next batch of IoT gateway data collections (e.g., as requested by the SDN cloud 104).

Figure 2A:
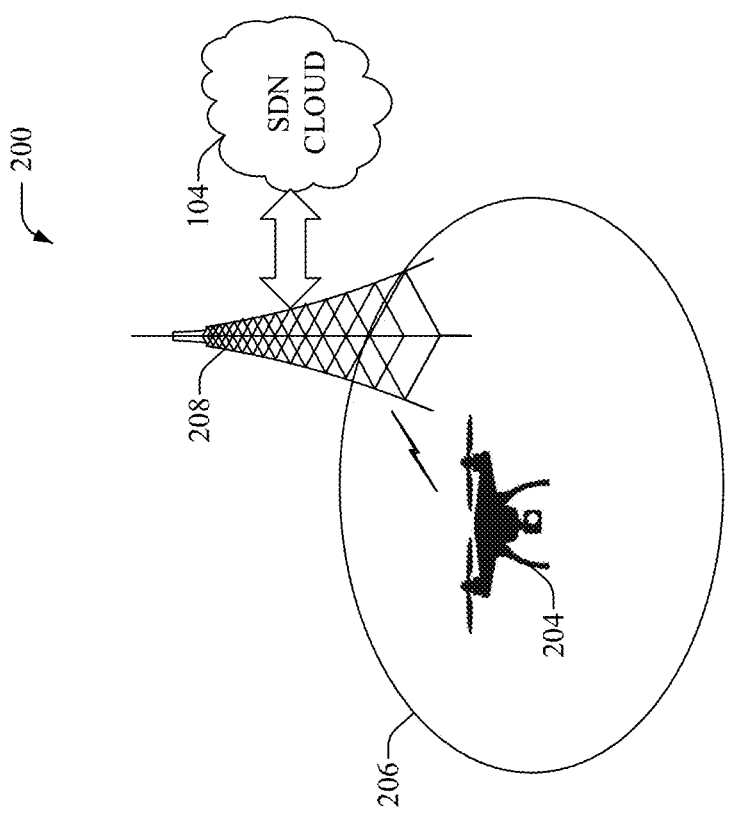
FIGS. 2A-2B illustrate example systems that facilitate management of IoT gateways via a fly-by drone.
Figure 2A:
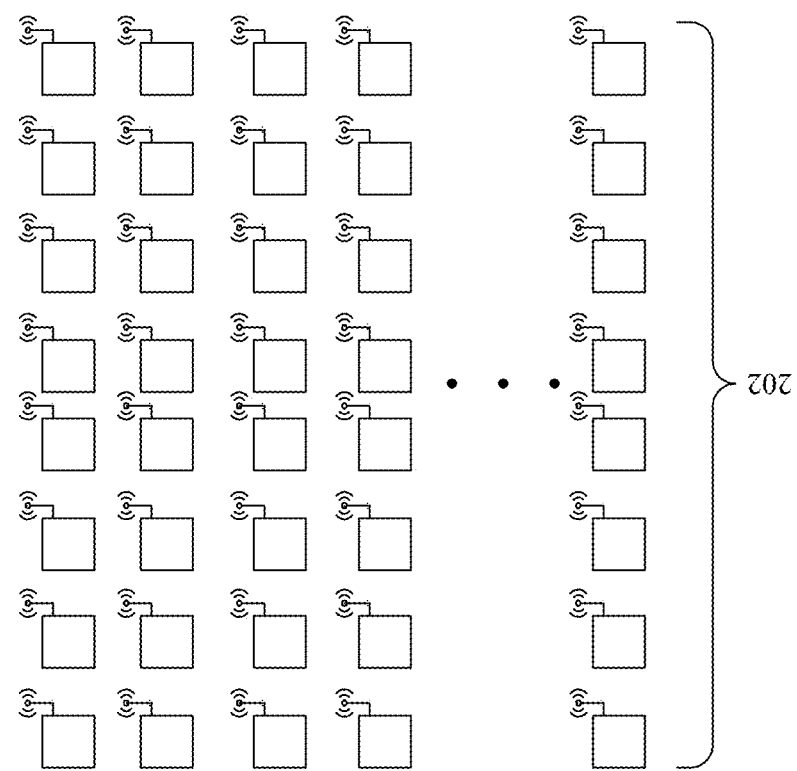
Figure 2B:
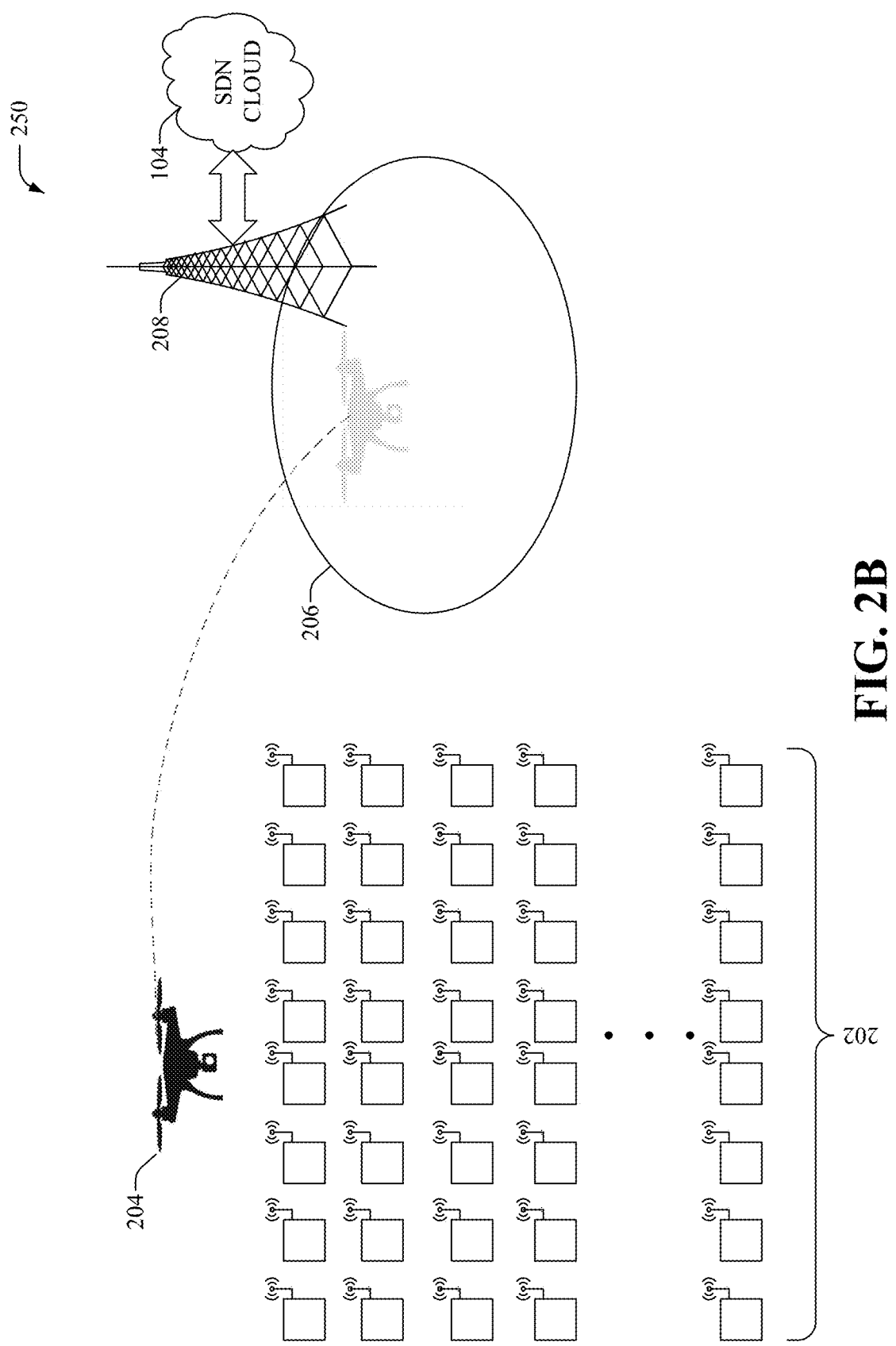

Referring now to FIGS. 2A-2B, there illustrated are example systems (200, 250) that facilitate management of IoT gateways via fly-by drones, in accordance with an aspect of the subject disclosure. In one example, the systems (200, 250) can comprise massively distributed IoT gateways 202 that can be deployed in remote areas that do not have network coverage (and/or have limited network coverage). The IoT gateways 202 can be embedded with and/or coupled to one or more sensors, for example, that measure environmental data. Moreover, network connectivity, and thus IoT services, can be provided to the IoT gateways 202 by utilizing one or more drones 204 that facilitate a transfer of data between the IoT gateways 202 and the SDN cloud 104. It is noted that the SDN cloud 104 can comprise functionality as more fully described herein, for example, as described above with regard to system 100. Although, the systems and methods disclosed herein are described with respect to fly-by drones, it is noted that the subject disclosure is not limited to drones and that most any partially and/or fully autonomous mobile vehicle and/or device can be utilized.

According to an aspect, mobile network operators (MNOs) can employ system 200 to provide IoT services by utilizing low-cost IoT gateways 202 (e.g., each costing less than $10), wherein their mobile networks (e.g., LTE, 5G, etc.) can be extended with network-operated drone(s) 204 to communicate with and manage the IoT gateways 202. The IoT gateways 202 can be distributed across large areas (e.g., fields, farms, forests, etc.) and can employ most any sensor (e.g., temperature, humidity, moisture, light, camera, etc.) associated with an IoT service related to the MNO's customers. Power conservation of the IoT gateways 202 is critical to maximize longevity in the field and accordingly, the IoT gateways 202 can operate utilizing low-power communication protocols. Ideally, the IoT gateways 202 can operate in a low-power/sleep mode and can be woken up, for example, only to perform measurements and/or data collection tasks and/or to communicate with the drone 204. Further, since the drone 204 flies in close proximity (e.g., less than 400 meters away) to the IoT gateways 202, the transmission power utilized for communication can also be reduced. As an example, IoT gateways 202 and/or drone 204 can be owned, leased, and/or managed by the MNO.

According to an embodiment, drone 204 can be configured by the SDN cloud 104. For example, as shown in FIG. 2A, the drone 204 can enter (or be located within) a coverage area 206 of an access point 208 (e.g., macro access point, base station, eNodeB, HnodeB, femto access point, etc.) of the communication network (e.g., mobility network) to communicate with the SDN cloud 104. The drone 204 can receive (e.g., periodically, in response to an event, on-demand, etc.) instruction data from the SDN cloud 104. The instruction data can comprise, but is not limited to, geographical location of one or more of the IoT gateways 202, configuration data that is to be provided to one or more of the IoT gateways 202, etc. As an example, the configuration data can comprise a task and/or workload that is to be performed by a IoT gateway (e.g., collect specific measurements, a time and/or frequency at which measurement data is to be captured, etc.).

As shown at FIG. 2B, on receiving the instruction data, drone 204 can fly, via a determined route (e.g., determined by the drone 204 and/or the SDN cloud 104) near (e.g., 300-400 meters above) the one or more IoT gateways 202 to initiate communication with the IoT gateways 202. As an example, the drone 204 can transmit trigger signals to wake up the one or more IoT gateways 202 and once the one or more IoT gateways 202 have woken up, the drone 204 can transfer the configuration data to the one or more IoT gateways 202 and/or receive measurement data from the one or more IoT gateways 202. According to an aspect, low-power transmissions can be utilized to facilitate the communications between the drone 204 and the one or more IoT gateways 202. As an example, most any wireless communication technologies (e.g., licensed and/or unlicensed technologies) can be utilized for the communication. In another example, the drone 204 can communicate via broadcast, multicast, and/or unicast communication protocols.

According to an embodiment, after data acquisition from the one or more IoT gateways 202, the drone 204 can return within the coverage area of the nearest access point (e.g., access point 208 or a different access point (not shown) coupled to the SDN cloud 104), couple to the access point, and transfer the measurement data collected from the one or more IoT gateways 202 to the SDN cloud 104 for further processing. As an example, the SDN cloud 104 can analyze the measurement data and present the results to a subscriber via a dashboard portal, generate reports, notifications, and/or alerts, control operations (e.g., turn on sprinklers, reduce water supply, control fertilizer spray, etc.), and/or determine new instruction data for the drone 204 (or a disparate drone). In an aspect, after the transfer of data (and/or at most any other time), the drone 204 can dock at a recharging station to charge its battery and/or refuel.

In some embodiments, drone 204 can be utilized to place an IoT gateway at a specified location and/or pick up an IoT gateway (e.g., a faulty IoT gateway) from a specified location. Additionally, or optionally, drone 204 can act like a watchdog, wherein it can sense data (e.g., motion, heat, sound, temperature, etc.) that can trigger actions (e.g., data collection from IoT gateways 202 and/or ping for new instructions from SDN cloud 104, etc.). In another embodiment, drone 204 can communicate with other drones in the area, for example, for load balancing and/or coordination of tasks.

Figure 3:
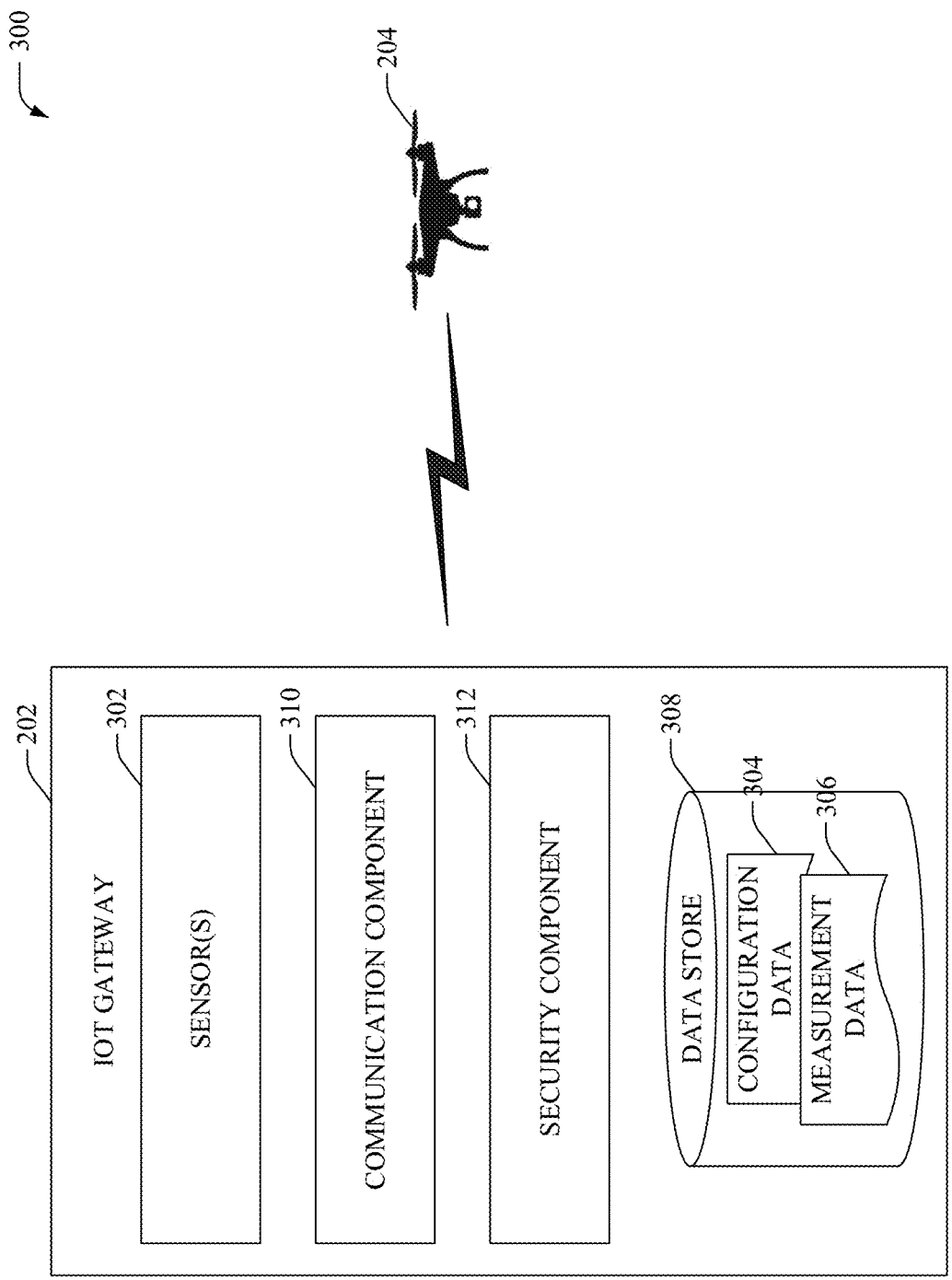
FIG. 3 illustrates an example system that comprises an IoT gateway that is managed by a software-defined networking (SDN) cloud by utilizing fly-by drone(s).

Referring now to FIG. 3, there illustrated is an example system 300 that comprises an IoT gateway that is managed by a SDN cloud by utilizing fly-by drone(s), in accordance with an aspect of the subject disclosure. As an example, the IoT gateway 202 can comprise a low-cost, low-power, MNO-managed gateway that can be deployed in remote and/or inaccessible areas that typically do not have network coverage (or have very limited network coverage). Generally, the cost of the IoT gateway 202 can be very low (e.g., less than 10 USD) and it can be positioned manually or by the drone 204 at defined locations or within defined areas. In one aspect, the size of the IoT gateway 202 can be fairly small (e.g., 4×4×4 cubes) and it can be environmentally packaged for withstanding high heat and/or low temperatures. As an example, the IoT gateway 202 can utilize embedded solar panels and/or high-efficiency batteries (e.g., battery back-up) as a power source. It is noted that the IoT gateway 202 and drone 204 can comprise functionality as more fully described herein, for example, as described above with regard to system 200.

In one aspect, the IoT gateway 202 can comprise (and/or be coupled to) one or more sensors 302, such as but not limited to, a camera, a temperature sensor, a humidity sensor, a light sensor, an air quality sensor, a gas levels measurement sensor, etc. In the example of agricultural applications, wherein the IoT gateway 202 is deployed within a field, most any sensors that measure parameters, such as, but not limited to, soil temperature, pH levels, chemical compositions, moisture, and/or humidity, light density, electromagnetic spectrum to ultraviolet and/or infrared rays, etc. can be utilized. The measurements can be performed during time periods specified within configuration data 304 defined by the SDN cloud (e.g., based on user preferences, operator preferences, power optimization policies, on-demand when triggered by the drone 204, etc.). In one aspect, the configuration data 304 can specify what data is to be captured and a frequency of the data capture. For example, during a seeding or germination phase associated with a crop cycle, the configuration data 304 can indicate that soil parameters be measured more frequently and/or during a harvest phase of the crop cycle, the configuration data 304 can indicate that photos be captured more frequently to enable accurate prediction of ripeness. In another example, during a drought, water levels and/or moisture levels can be monitored more closely. Further, measurement data 306 captured by the sensors 302 can be stored within data store 308. As an example, the measurement data 306 can be compressed, encrypted, time stamped, and/or linked with an identifier of the IoT gateway 202.

To conserve power and extend battery life, the IoT gateway 202 remains in a sleep or low-power mode unless woken-up to collect measurement data 306 and/or communicate with the drone 204. In one aspect, a communication component 310 can comprise a wireless electrical switch that controls an operation mode of the IoT gateway 202 and that can be turned on based on a trigger signals received from drone 204. For example, the IoT gateway 202 can comprise a low-power receiver that listens for a signal, for example, a presence of energy on a radio frequency (RF) band and/or other technology (e.g., Bluetooth, Wi-Fi, GWave, etc.). Additionally, or alternatively, the IoT gateway 202 can comprise an acoustic sensor that can trigger the electronic switch in response to detecting a sound of the drone 204 as it flies close to the IoT gateway 202. When the electrical switch is turned on, the IoT gateway 202 can be woken up from the sleep/low-power mode and the communication component 310 can facilitate a communication with the drone 204. In one aspect, security component 312 can be utilized to verify authorization of the drone 204 to communicate with the IoT gateway 202 (e.g., based on drone identifier, drone type, and/or most any credential data, etc). If verified that the drone 204 is authorized to communicate with the IoT gateway 202, the communication component 310 can transfer the measurement data 306 (e.g., linked with a device identifier associated with the IoT gateway 202) to the drone 204 and/or can receive, from the drone 204, configuration data 304 (and/or updates to the configuration data 304) that can be stored within data store 308. In some embodiments, the IoT gateway 202 can also comprise (or be coupled to) one or more controller elements (not shown), wherein the configuration data 304 can specify tasks to be performed by the controller elements, for example, turning on sprinklers, spraying more pesticides, etc. As an example, the measurement data 306 can be compressed for reduced impact on power level needed for communication with the drone 204. Alternatively, if determined that the drone 204 is not authorized to communicate with the IoT gateway 202, the communication component 310 can prohibit communication with the drone 204 and trigger the IoT gateway 202 to reenter the sleep/low-power mode.

According to an embodiment, the communication component 310 can employ most any low-cost and/or low-power communication technology and/or protocol for communication with the drone 204, such as, but not limited to Wi-Fi, LTE, citizens broadband radio service (CBRS), Bluetooth, etc. In one aspect, the IoT gateway 202 can comprise multiple communication modules that utilize different communication technologies and/or protocols and the communication component 310 can select and utilize the most efficient interface for the communication. Once the data transfer between the IoT gateway 202 and the drone 204 is completed, the communication component 310 can trigger the IoT gateway 202 to reenter the sleep/low-power mode.

Figure 4:
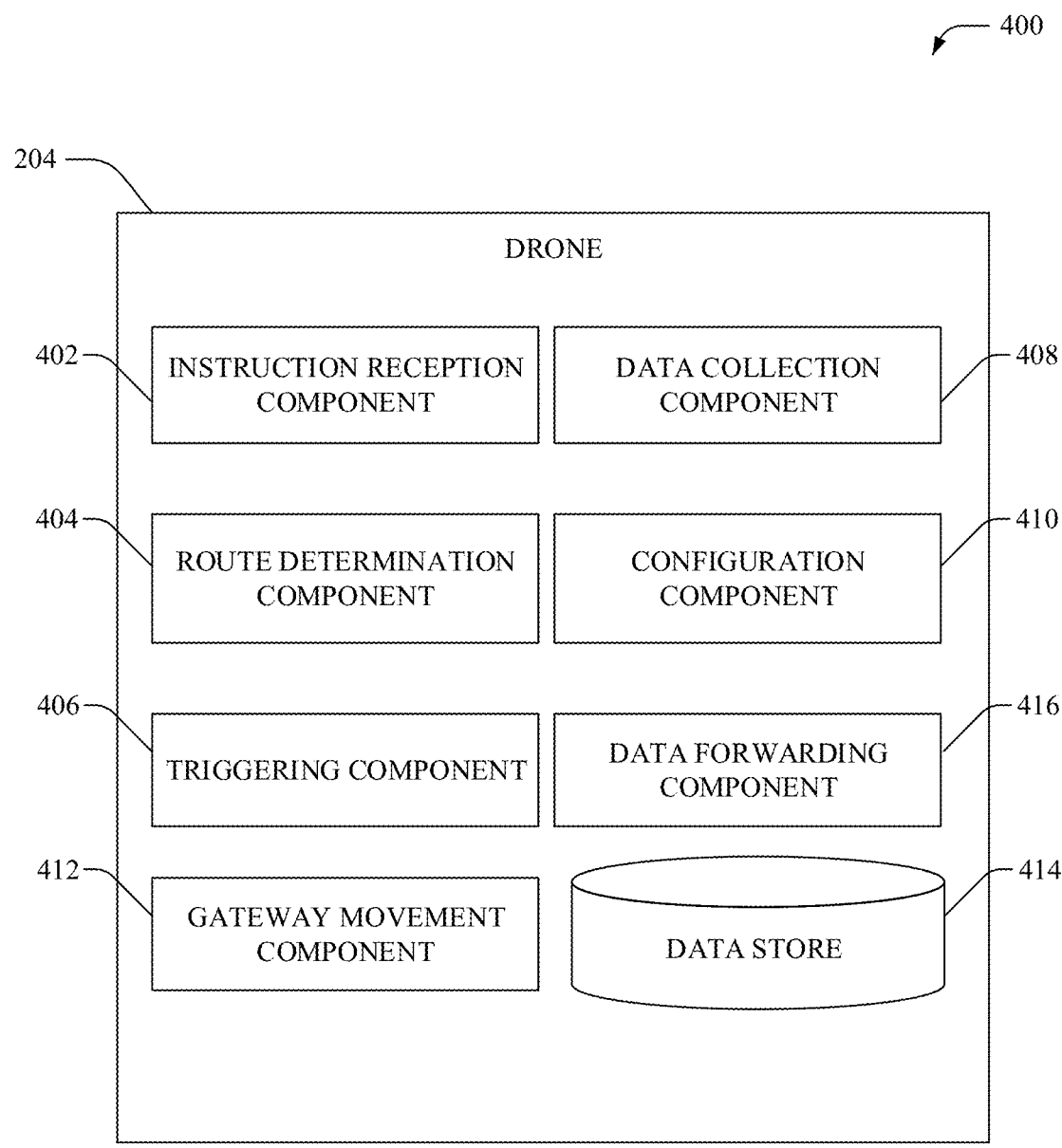
FIG. 4 illustrates an example system comprising a fly-by drone that can be utilized to facilitate communication between distributed IoT gateways and a SDN cloud of a mobility network.

Referring now to FIG. 4, there illustrated is an example system 400 comprising a fly-by drone that can be utilized to facilitate communication between distributed IoT gateways and a SDN cloud of a mobility network, according to an aspect of the subject disclosure. The drone 204, empowered by SDN communication protocols, can wake/trigger the IoT gateways adaptively and perform data collection and/or configuration tasks while flying close to the IoT gateways. Accordingly, the IoT gateways can conserve power by utilizing low-power transmissions to communicate with drone 204. Further, the drone 204 can deliver the collected data (e.g., measurement data 306) to nearby mobility network and return for the next batch of IoT gateway data collections and/or configurations. It is noted that the drone 204 can comprise functionality as more fully described herein, for example, as described above with regard to system 200, 250, and 300.

In one embodiment, the drone 204 can be activated at most any time, for example, periodically, in response to receiving instructions from the SDN cloud, in response to receiving triggers from external sensors (e.g., acoustic sensor, temperature sensor, air quality sensor, light sensor, etc.). Typically, the drone 204 can couple to the SDN cloud, via most any radio access network (e.g., LTE, 5G, 3G, etc.). In one aspect, the drone can comprise a subscriber identity module (SIM) and facilitate SIM-based authentication to connect to the radio access network. According to an aspect, an instruction reception component 402 can receive instruction data from the SDN cloud (e.g., periodically, in response to an event, on-demand, etc.) and store the received instruction data in data store 414. For example, the instruction data can specify when to fly, a set of IoT gateways from which data is to be collected, a set of IoT gateways that are to be reconfigured, configuration data, etc.

Based on the received instruction data, a route determination component 404 can be utilized to determine an optimal flying path for the drone 204, for example, based on a location of the IoT gateways (e.g., determined via global position system (GPS) information), and determine an optimal location and/or time for which the drone 204 is to stop (e.g. hover) while communicating with the IoT gateways. In one embodiment, the drone 204 can slowly move near/above each IoT gateway, wake up the communication channels on the IoT gateway (e.g., by employing triggering component 406), perform a handshake, and perform the instructed data acquisition and/or data configuration tasks (e.g., by employing data collection component 408 and configuration component 410 respectively). In another embodiment, the drone 204 can simultaneously (or substantially simultaneously) wake up the communication channels on a group of IoT gateways (e.g., by employing triggering component 406) based on utilizing broadcast and/or multicast communications. In yet another embodiment, the drone 204 can dynamically wake up (e.g., by employing triggering component 406) the communication channels on select IoT gateways that determined to operate on demand. As an example, the triggering component 406 can transmit a signal via most any wireless technology (e.g., cellular, Bluetooth, Wi-Fi, GWave, etc.) that can be detected by a receiver of the IoT gateway, which in turn can turn on the IoT gateway (e.g., exit the low-power/sleep mode). Once the data acquisition and/or data configuration tasks are completed, the IoT gateways can be returned to a low-power/sleep mode.

The communication between the drone 204 and the IoT gateway can be facilitated via low-cost and/or low-power signaling. As an example, the IoT gateways can communicate via different protocols. In one aspect, the data collection component 408 can receive measurement data (e.g., sensor records and/or logs with corresponding timestamps) that has been linked to the respective IoT gateways (e.g., based on a gateway ID). As an example, the measurement data can be stored within data store 414. Further, the configuration component 410 can transfer, to one or more IoT gateways, configuration data (e.g., determined and provided by the SDN cloud) that can be utilized to program the one or more IoT gateways. For example, the configuration data can comprise, but is not limited to, software upgrades, sensor settings, data collection policies and/or preferences, etc.

Once the data collection and/or configuration tasks have been completed, the drone 204 can fly towards and enter an area having network coverage, connect to a radio access network, and provide the measurement data to the SDN cloud (e.g., by employing a data forwarding component 416) in secure manner. Further, the drone 204 can refuel and/or recharge and standby until new instructions (e.g., for data acquisition and/or gateway configuration) are received from the SDN cloud. In some example, embodiments, the drone 204 can perform the data acquisition from the IoT gateways and the transfer of acquired data to the SDN cloud periodically, for example, based on operator and/or user defined policies.

Additionally, or optionally, the drone 204 can comprise a gateway relocation component 412 that can be utilized to physically change locations of the IoT gateways, place additional IoT gateways at determined/defined locations (e.g., where more detailed and/or localized measurements are needed), remove existing IoT gateways from defined areas (e.g., in response to determining that the IoT gateway is not functioning properly and/or is non responsive). As an example, the SDN cloud can instruct the gateway relocation component 412 to move, remove, and/or redistribute the IoT gateways within a defined area (e.g., a field/farm). In these example scenarios, the drone 204 can comprise retractable arms (and/or other mechanisms) that can be utilized to pick up and/or drop off the IoT gateway. According to an embodiment, a collection of drones can be operated in coordinated mode, with clear flying paths, to capture the IoT gateways.

It is noted that the data stores described herein (e.g., data store 308 and data store 414) can comprise volatile memory(s) or nonvolatile memory(s) or can comprise both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

Figure 5:
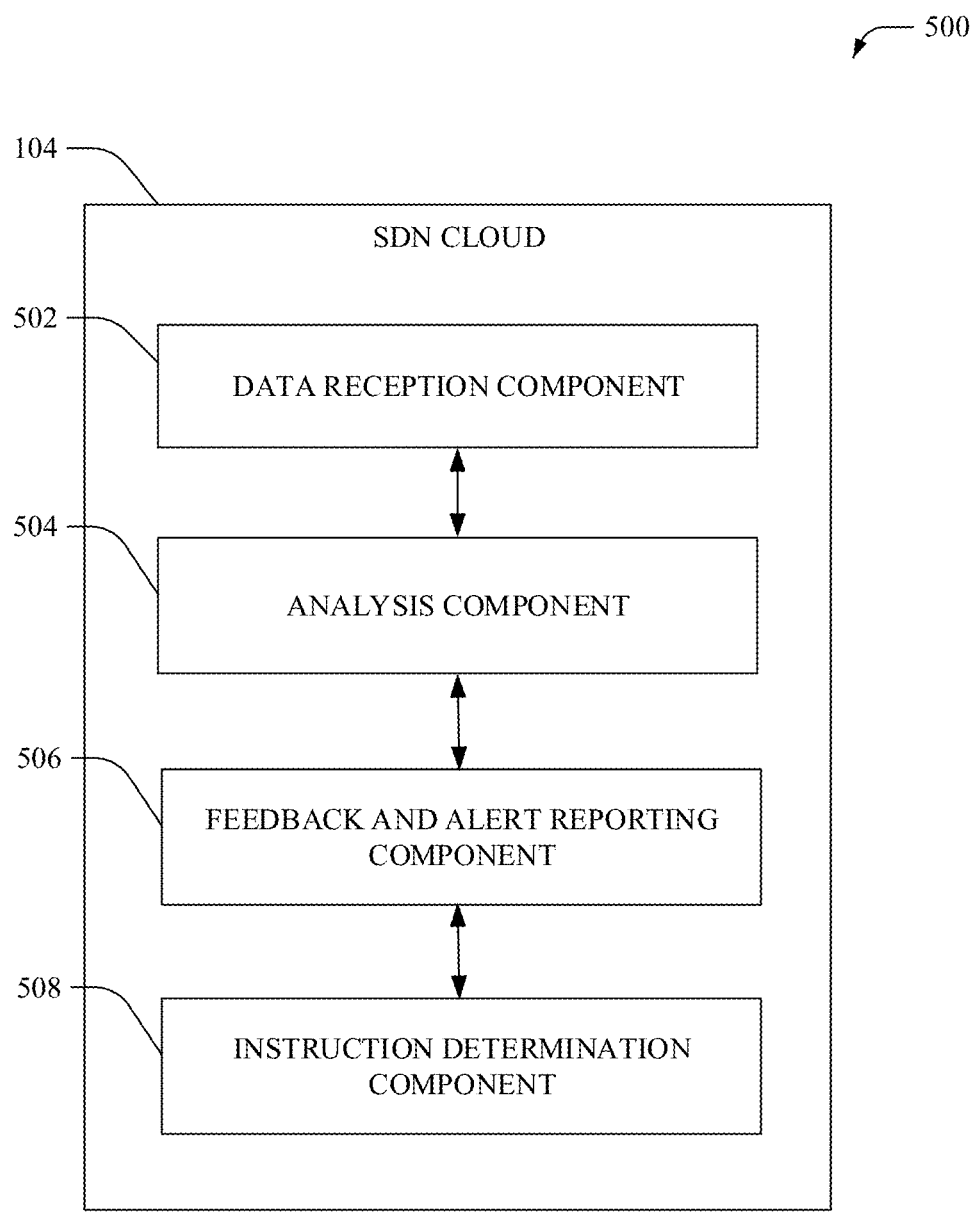
FIG. 5 illustrates an example system that provides IoT services to distributed IoT gateways via one or more fly-by drones.

FIG. 5 illustrates an example system 500 that provides IoT services to distributed IoT gateways via one or more fly-by drones, according to an aspect of the subject disclosure. As an example, MNOs can introduce IoT services in remote regions that do not have network coverage, by utilizing fly-by drone(s) that link IoT gateways deployed within the remote regions to the SDN cloud. It is noted that the SDN cloud 104 can comprise functionality as more fully described herein, for example, as described above with regard to systems 100-400.

According to an aspect, the fly-by drone(s) can collect data from the IoT gateways (e.g., periodically and/or on-demand) and couple to a RAN to forward the data to a data reception component 502. In one example, in addition to the collected data, the data reception component 502 can receive data from one or more other data sources, such as, but not limited to a local data store (not shown) that stores information regarding the IoT gateways (e.g., current configurations, capabilities, features, location, etc.), operator preferences, user preferences, service provider preferences, etc., and/or an external data store(s) (not shown), for example, web servers, content servers, etc. that provide additional information (e.g., weather information, news and/or traffic reports, event data, meteorological data, etc.) that can be utilized to enable the IoT service and/or to reconfigure the IoT gateways.

Further, an analysis component 504 can evaluate the received data (e.g., using Big data analysis, machine learning, etc.) to determine one or more actions. As an example, based on the analysis, a feedback and alert reporting component 506 can determine display data that can be presented, via dashboards accessible to a subscriber (e.g., via the subscriber's user equipment), network operator, and/or service provider. In another example, in response to determining that defined alert criteria are met (e.g., measured values exceed defined thresholds), appropriate devices and/or personnel can be notified, for example, to take actions, such as, but not limited to, adjust IoT gateway and/or drone settings, instruct control systems (e.g., increase/decrease water supply, add fertilizer, add pesticides, start harvesting crops, etc.), and the like. Further, an instruction determination component 508, can be utilized to generate new instructions and/or configurations for the drone and/or IoT gateways (e.g., frequency of data collection, which sensors are to be activated, which sensors are to be deactivated, etc.). The instructions and/or configurations can be transferred to the drone at most any time, for example, periodically, in response to determining that the drone has coupled to the network, in response to determining that the drone has completed a transferred data acquired from the IoT gateways, etc.

As an example, in agricultural applications, the analysis component 504 can determine disease and/or diagnosis based on photos of plants, which can be forwarded to experts via the feedback and alert reporting component 506. In another example, the analysis component 504 can determine an optimal level of nutrients that are to be added to a fertilizer mix at different locations in a field, for example, based on soil composition data sensed by the distributed IoT gateways. In yet another example, the analysis component 504 can determine an optimal water level that is to be provided to the crops in the field based on moisture, temperature, and/or humidity levels sensed by the distributed IoT gateways. In yet another example, the analysis component 504 can determine if the crops are ready for harvest for example, based on an analysis of photos of fruits and/or vegetables, captured by the distributed IoT gateways. Moreover, the data determined by the analysis component 504 can be presented to a subscriber and/or provided to a control system that can automatically perform the desired actions (e.g., open a valve, reduce water supply, create a fertilizer mixture, etc.).

Further, the analysis component 504 can determine, based on the analysis of the received data, configuration data that can configure or reconfigure one or more IoT gateways. For example, different information can be required for analysis at different times and accordingly, the analysis component 504 can configure the one or more IoT gateways to capture the required data at a particular time, for example, based on defined policies and/or if more details are required at specific locations and/or times. The instruction determination component 508 can forward the configuration data to one or more drones that can fly near the one or more IoT gateways to transfer the configuration data to the one or more IoT gateways.

Additionally, or optionally, the analysis component 504 can also determine, based on the analysis of the received data, a distribution of the IoT gateways within a field (or other region) and can instruct one or more drones to relocate the IoT gateways to specific locations. In another example, the analysis component 504 can determine faulty IoT gateways that are not operating properly and can instruct a drone to move them to a repair facility. In yet another example, the analysis component 504 can determine areas where additional information is required and can instruct the drone to pick up additional IoT gateway device(s), from a network operator facility, and place them at defined locations within the areas.

Figure 6:
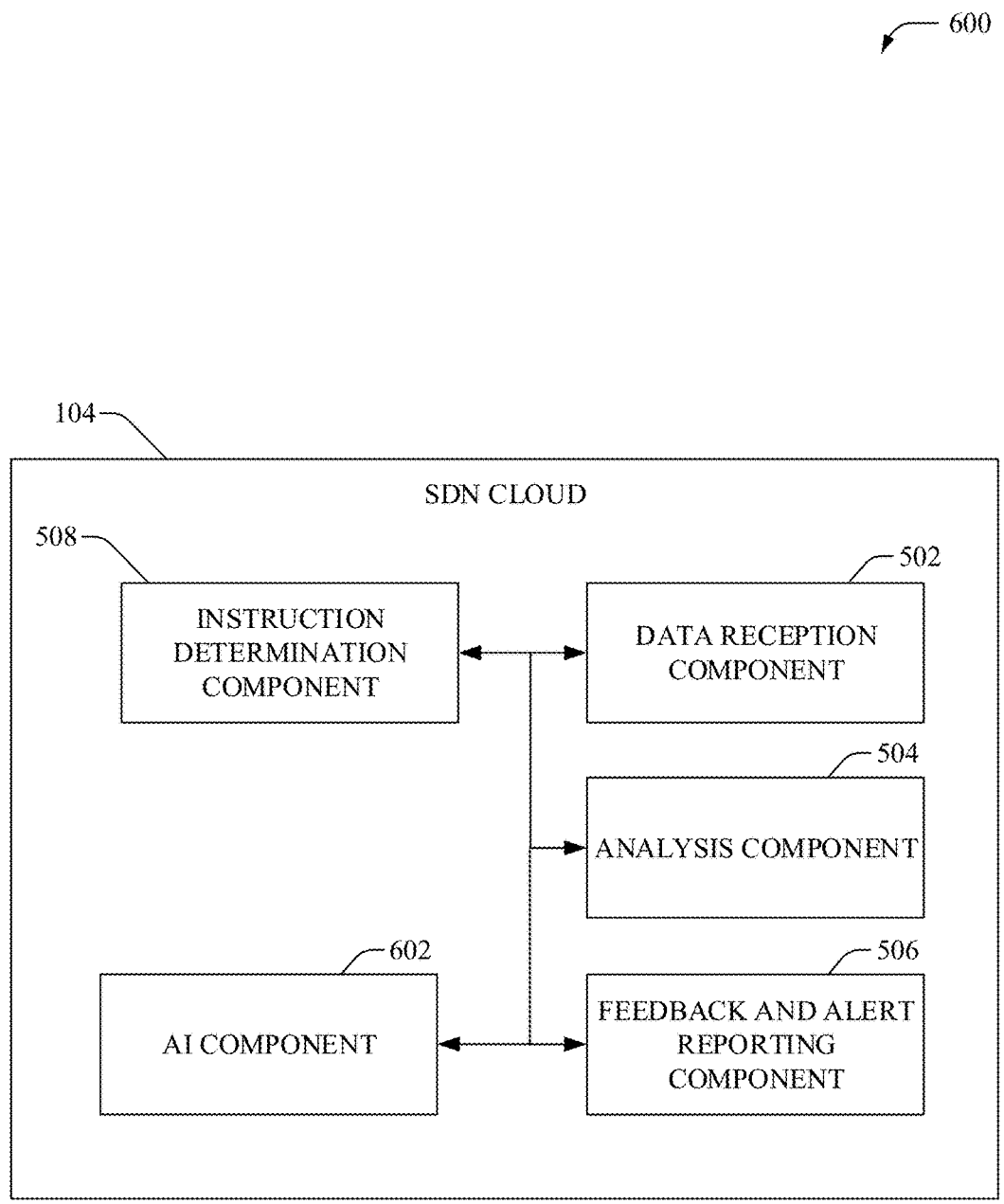
FIG. 6 illustrates an example system that facilitates automating one or more features in accordance with the subject embodiments.

Referring now to FIG. 6, there illustrated is an example system 600 that employs an artificial intelligence (AI) component (602) to facilitate automating one or more features in accordance with the subject embodiments. It can be noted that the SDN cloud 104, data reception component 502, analysis component 504, feedback and alert reporting component 506, and instruction determination component 508 can comprise functionality as more fully described herein, for example, as described above with regard to systems 100-500.

In an example embodiment, system 600 (e.g., in connection with providing IoT services.) can employ various AI-based schemes (e.g., intelligent processing/analysis, machine learning, etc.) for carrying out various aspects thereof. For example, a process for analyzing data measured by IoT gateways, determining tasks to be performed, determining configuration of the IoT gateways, etc. can be facilitated via an automatic classifier system implemented by AI component 602. Moreover, the AI component 602 can exploit various artificial intelligence (AI) methods or machine learning methods. Artificial intelligence techniques can typically apply advanced mathematical analysis—e.g., decision trees, neural networks, regression analysis, principal component analysis (PCA) for feature and pattern extraction, cluster analysis, genetic algorithm, or reinforced learning—to a data set. In particular, AI component 602 can employ one of numerous methodologies for learning from data and then drawing inferences from the models so constructed. For example, hidden markov models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/operator preferences, historical information, receiving extrinsic information, type of service, type of device, etc.). For example, SVMs can be configured via a learning or training phase within a classifier constructor and feature selection module. Thus, the classifier(s) of AI component 602 can be used to automatically learn and perform a number of functions, comprising but not limited to determining according to a predetermined criteria, when and which actions are to be performed (e.g., opening/closing a valve, adding fertilizer, initiate harvesting of crops, changing irrigation controls, etc.), notifications provided to a subscriber, configuration of IoT gateways and/or drones, load balancing between drones, etc. The criteria can comprise, but is not limited to, historical patterns and/or trends, network operator preferences and/or policies, customer preferences, predicted traffic flows, event data, latency data, reliability/availability data, current time/date, sensor data, weather data, type of IoT device, news, and the like.

FIGS. 7-11 illustrate flow diagrams and/or methods in accordance with the disclosed subject matter. For simplicity of explanation, the flow diagrams and/or methods are depicted and described as a series of acts. It is to be understood and noted that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and note that the methods could alternatively be represented as a series of interrelated states via a state diagram or events. Additionally, it should be further noted that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 7:
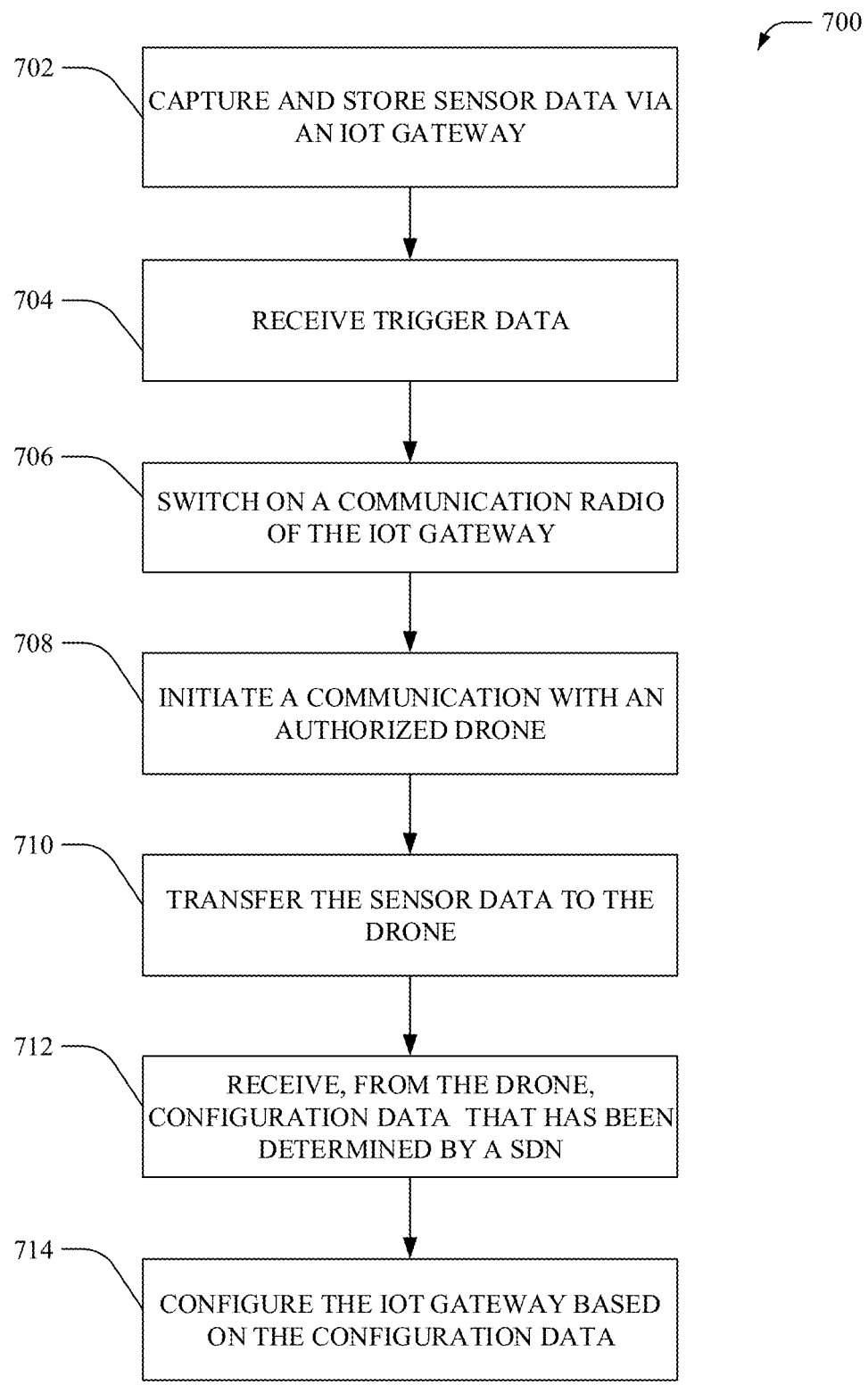
FIG. 7 illustrates an example method that facilitates utilization of SDN-controlled massively distributed IoT gateways to enable IoT services.

Referring now to FIG. 7 there illustrated is an example method 700 that facilitates utilization of SDN-controlled massively distributed IoT gateways to enable IoT services, according to an aspect of the subject disclosure. In an aspect, method 700 can be implemented by one or more IoT gateways (e.g., IoT gateways 202) of a communication network (e.g., cellular network). The IoT gateways can be deployed in remote locations that typically do not have network coverage via traditional access points (e.g., macro access points, Wi-Fi access points, femto access points, etc.). In one aspect, the IoT gateways can be embedded with (and/or coupled to) one or more sensors, for example, that capture environmental data. At 702, sensor data can be captured by and stored within the IoT gateway. As an example, the sensor data can be captured periodically, based on instructions provided by an SDN, and/or on-demand (e.g., when woken-up/requested by a drone). In one aspect, the sensor data can be encrypted and/or compressed and stored within a data store of the IoT gateway. In another aspect, the sensor data can be linked with timestamps (e.g., indicative of a time that the data was captured) and/or an identifier associated with the IoT gateway.

Typically, to minimize power consumption and extend battery life, the IoT gateway can remain in a sleep and/or low-power mode (e.g., wherein communication radios are switched off) unless woken-up based on various triggers. At 704, trigger data can be received. For example, the trigger data can comprise a signal transmitted by a fly-by drone that wants to initiate communication with the IoT gateway. In one aspect, the signal can be transmitted via most any low-power radio technology. On receiving the trigger data, at 706, the communication radio of the IoT gateway can be switched on. At 708, communication can be initiated with an authorized drone. As an example, the communication can be facilitated via most any communication technology/protocol. Moreover, at 710, the sensor data can be transferred to the drone (e.g., which can then forward the sensor data to the SDN). Further at 712, configuration data, that has been determined by the SDN, can be received from the drone and at 714, the IoT gateway can be configured based on the configuration data. For example, the configuration data can comprise, but is not limited to, software updates, instructions on activating/deactivating specific sensors, data collection parameters and/or frequency, etc.

Figure 8:
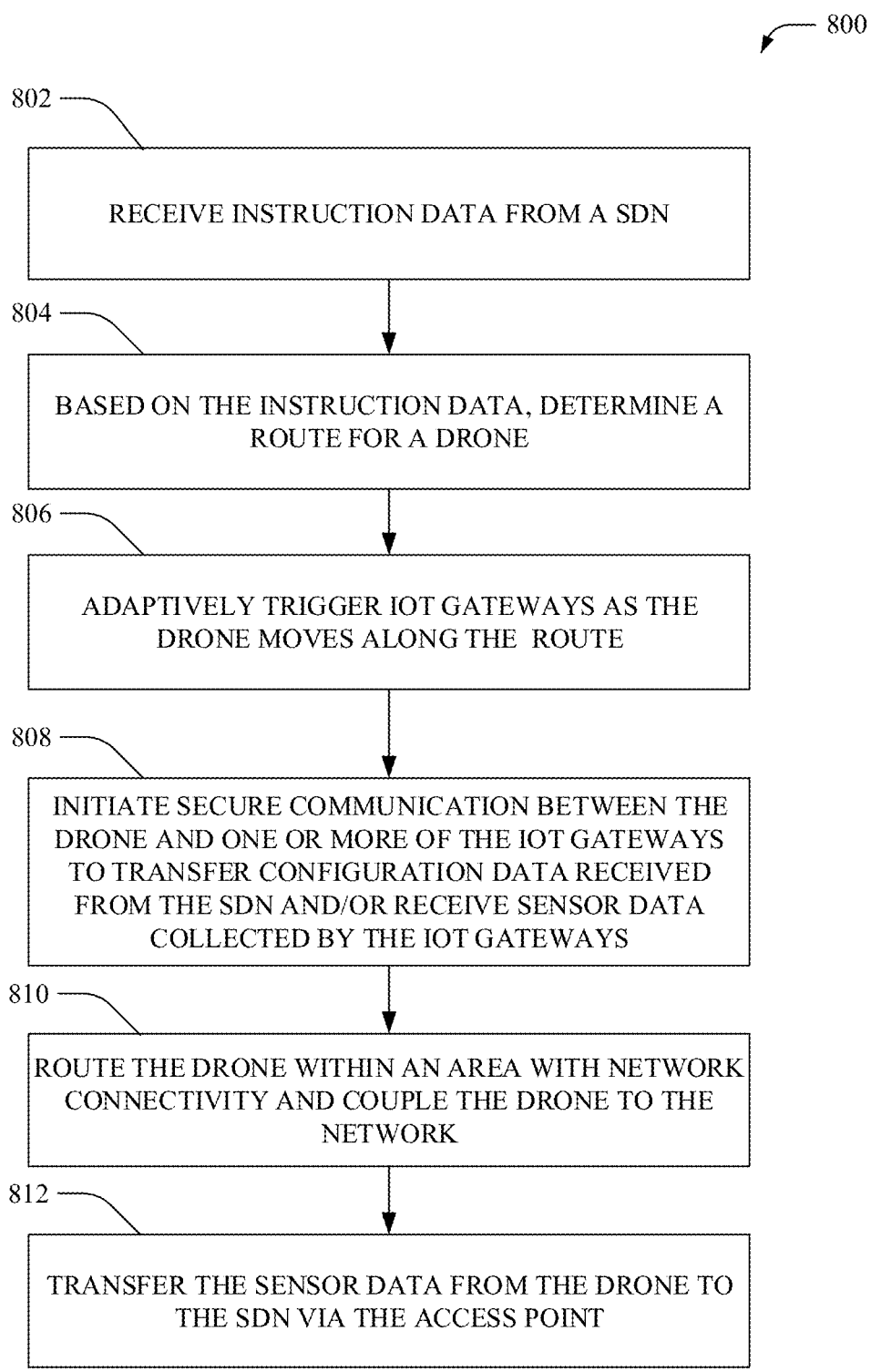
FIG. 8 illustrates an example method for utilizing a fly-by drone to facilitate communication between a SDN cloud and distributed IoT gateways.

FIG. 8 illustrates an example method 800 for utilizing a fly-by drone to facilitate communication between a SDN cloud and distributed IoT gateways, according to an aspect of the subject disclosure. As an example, method 800 is not limited to being implemented by a drone but can be implemented by most any autonomous mobile device (e.g., a self driving connected car) of a communication network (e.g., cellular network). In an aspect, the drone can comprise a cellular radio that can communicate with the SDN, for example, via a wireless access point. At 802, instruction data can be received from the SDN. As an example, the instruction data can indicate a set of IoT gateways, from which data is to be acquired and/or a set of IoT gateways, to which data (e.g., configuration data) is to be transferred.

At 804, based on the instruction data an optimal route for the drone (e.g., that enables the drone to fly near the IoT gateways) can be determined. At 806, the IoT gateways can be adaptively triggered as the drone moves along the route. Typically, the IoT gateways are in a low-power, standby, and/or sleep mode and can be woken up by transmitting a trigger signal on a specified communication band. At 808, secure communication between the drone and one or more of the IoT gateways can be initiated to transfer configuration data received from the SDN cloud to the IoT gateways and/or receive sensor data collected by the IoT gateways. As an example, the communication can comprise most any broadcast, multicast, and/or unicast communication protocols.

Further, at 810, the drone can be routed back within an area with network connectivity (e.g., within a coverage area of an access point of the network) and can be coupled to the network. Furthermore, at 812, the sensor data collected by the drone can be transferred, via the network, to the SDN for further processing.

Figure 9:
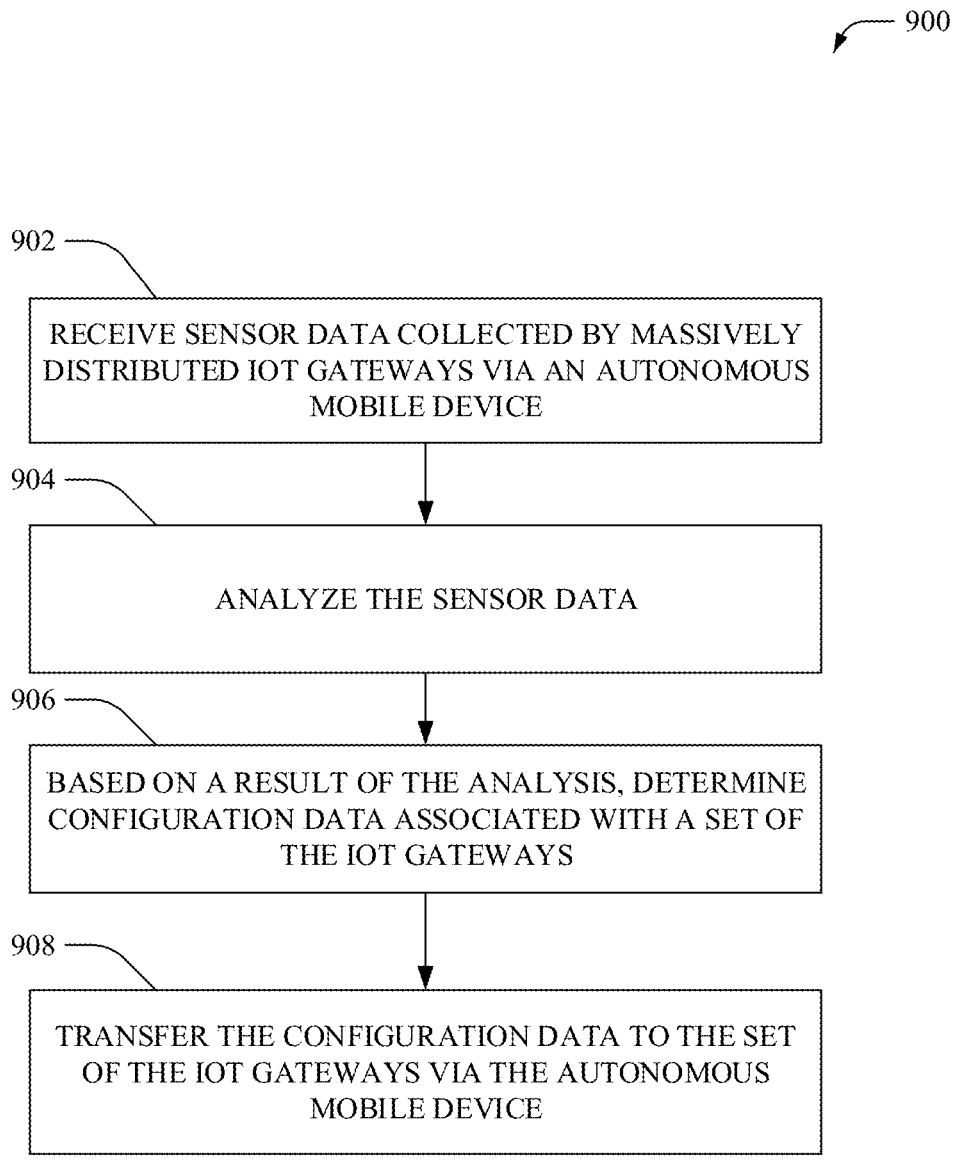
FIG. 9 illustrates an example method for managing distributed IoT gateways based on instructions received from a SDN cloud that are delivered via an autonomous mobile device.

FIG. 9 illustrates an example method 900 for managing distributed IoT gateways based on instructions received from a SDN cloud that are delivered via an autonomous mobile device, according to an aspect of the subject disclosure. As an example, method 900 can be implemented by one or more network devices of a communication network (e.g., cellular network). In an aspect, at 902, sensor data, collected by massively distributed IoT gateways, can be received via the autonomous mobile device, such as, but not limited to a drone. At 904, the sensor data can be analyzed (e.g., by employing big data analytics, machine learning techniques, etc.). As an example, additional data received from one or more network servers and/or third-party servers can also be utilized for the analysis.

At 906, based on a result of the analysis, configuration data associated with a set of the IoT gateways can be determined. For example, the configuration data can be utilized to program the IoT gateway and/or update capabilities of the IoT gateway. Further, at 908, the configuration data can be transferred to the set of the IoT gateways via the autonomous mobile device (e.g., a drone).

Figure 10:
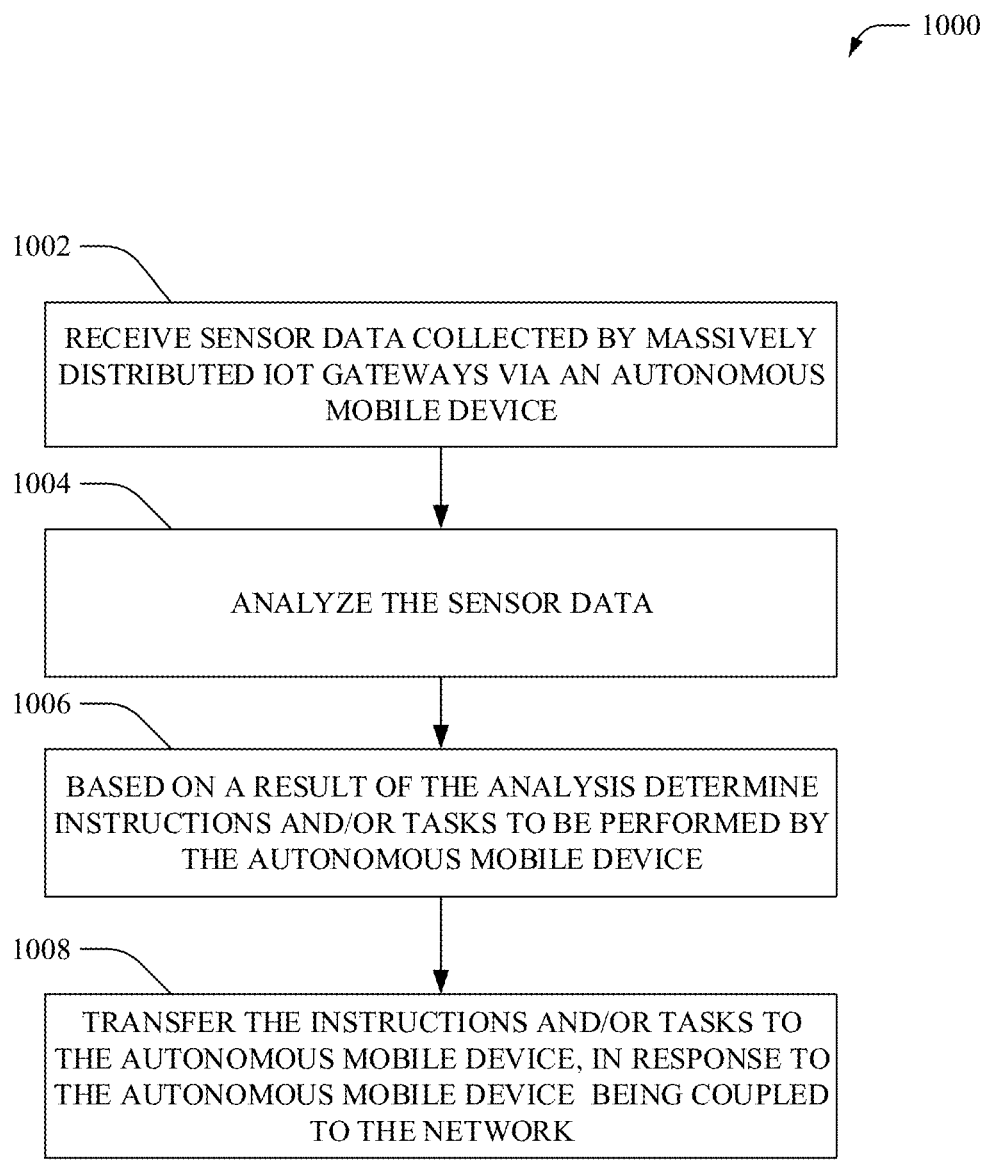
FIG. 10 illustrates an example method for managing an autonomous mobile device utilized to facilitate communications between distributed IoT gateways and a communication network.

FIG. 10 illustrates an example method 1000 for managing an autonomous mobile device utilized to facilitate communications between distributed IoT gateways and a communication network, according to an aspect of the subject disclosure. As an example, method 1000 can be implemented by one or more network devices of the communication network (e.g., cellular network). In an aspect, at 1002, sensor data, collected by massively distributed IoT gateways, can be received via the autonomous mobile device, such as, but not limited to a drone. At 1004, the sensor data can be analyzed (e.g., by employing big data analytics, machine learning techniques, etc.). As an example, additional data received from one or more network servers and/or third-party servers can also be utilized for the analysis.

At 1006, based on a result of the analysis, instructions and/or tasks to be performed by the autonomous mobile device can be determined. For example, the instructions can specify when the autonomous mobile device is to travel towards the IoT gateways, IoT gateways with which it can communicate, IoT gateways to which it can transfer data, IoT gateways from which it can receive data, type of communication protocol that is to be utilized for communication with the IoT gateways, location of the IoT gateways, etc. Further, in another example, tasks can comprise, relocating a IoT gateway(s), adding a supplementary IoT gateway(s) within a defined area, removing an existing IoT gateway(s) from the defined area, etc. At 1008, the instructions and/or tasks can be transferred to the autonomous mobile device, for example, in response to determining that the autonomous mobile device has coupled to the network (e.g., via a RAN).

Figure 11:
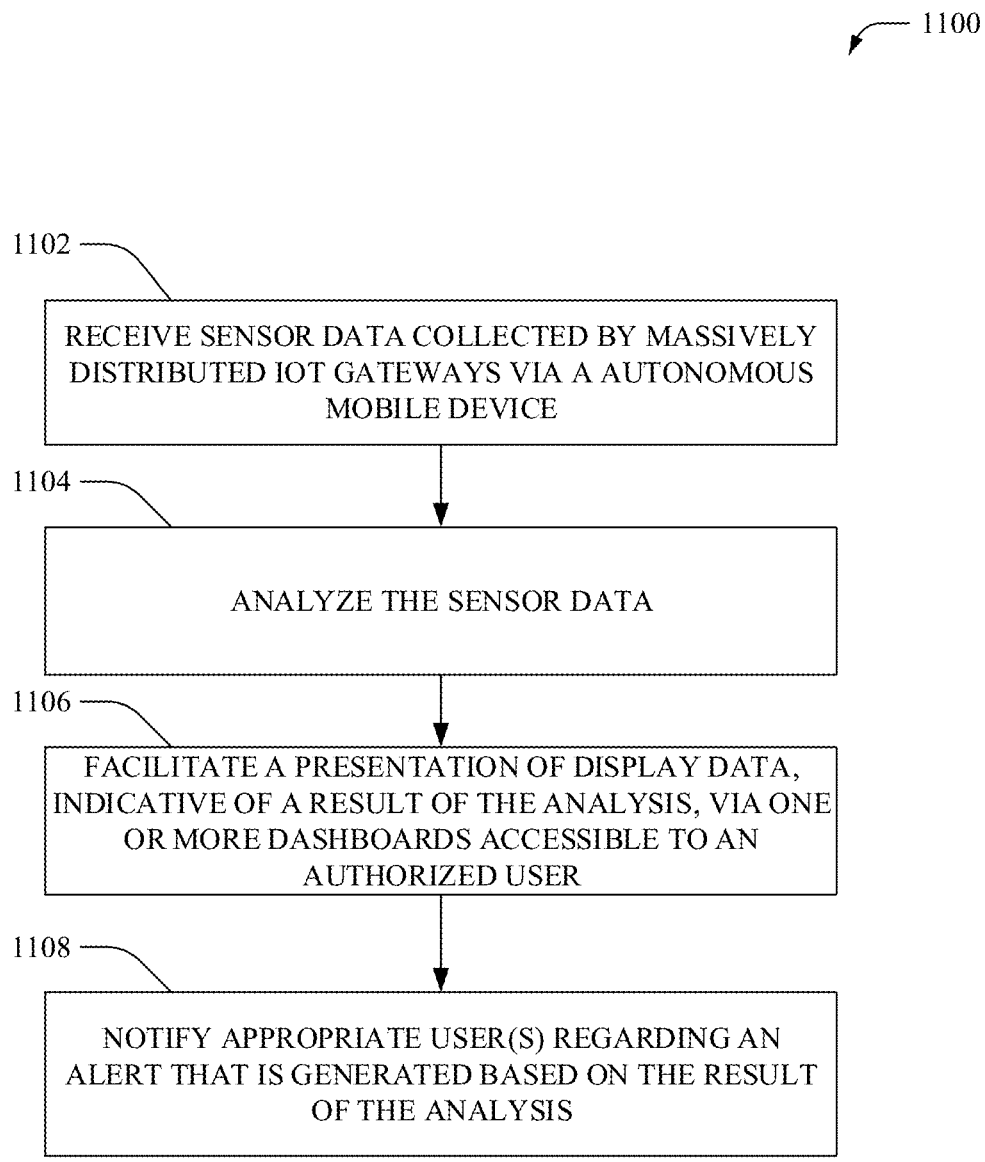
FIG. 11 illustrates an example method for monitoring information sensed by distributed IoT gateways that communicate with a SDN cloud via an autonomous mobile device.

FIG. 11 illustrates an example method 1100 for monitoring information sensed by distributed IoT gateways that communicate with a SDN cloud via an autonomous mobile device, according to an aspect of the subject disclosure. As an example, method 1100 can be implemented by one or more network devices of the communication network (e.g., cellular network). In an aspect, at 1102, sensor data, collected by massively distributed IoT gateways, can be received via the autonomous mobile device, such as, but not limited to a drone. At 1104, the sensor data can be analyzed (e.g., by employing big data analytics, machine learning techniques, etc.). As an example, additional data received from one or more network servers and/or third-party servers can also be utilized for the analysis.

At 1106, a presentation of display data, indicative of a result of the analysis, can be facilitated via one or more dashboards accessible to an authorized user (e.g., via a user equipment). As an example, the display data can comprise sensor data collected from IoT gateways, status reports of monitored objects (e.g., status and/or overall health of crops), and/or recommended actions to achieve a goal (e.g., add fertilizer to improve yield), etc. Further at 1108, appropriate user(s) can be notifies regarding an alert (e.g., an unexpected state, error condition, etc.) that is generated based on the result of the analysis.

Figure 12:
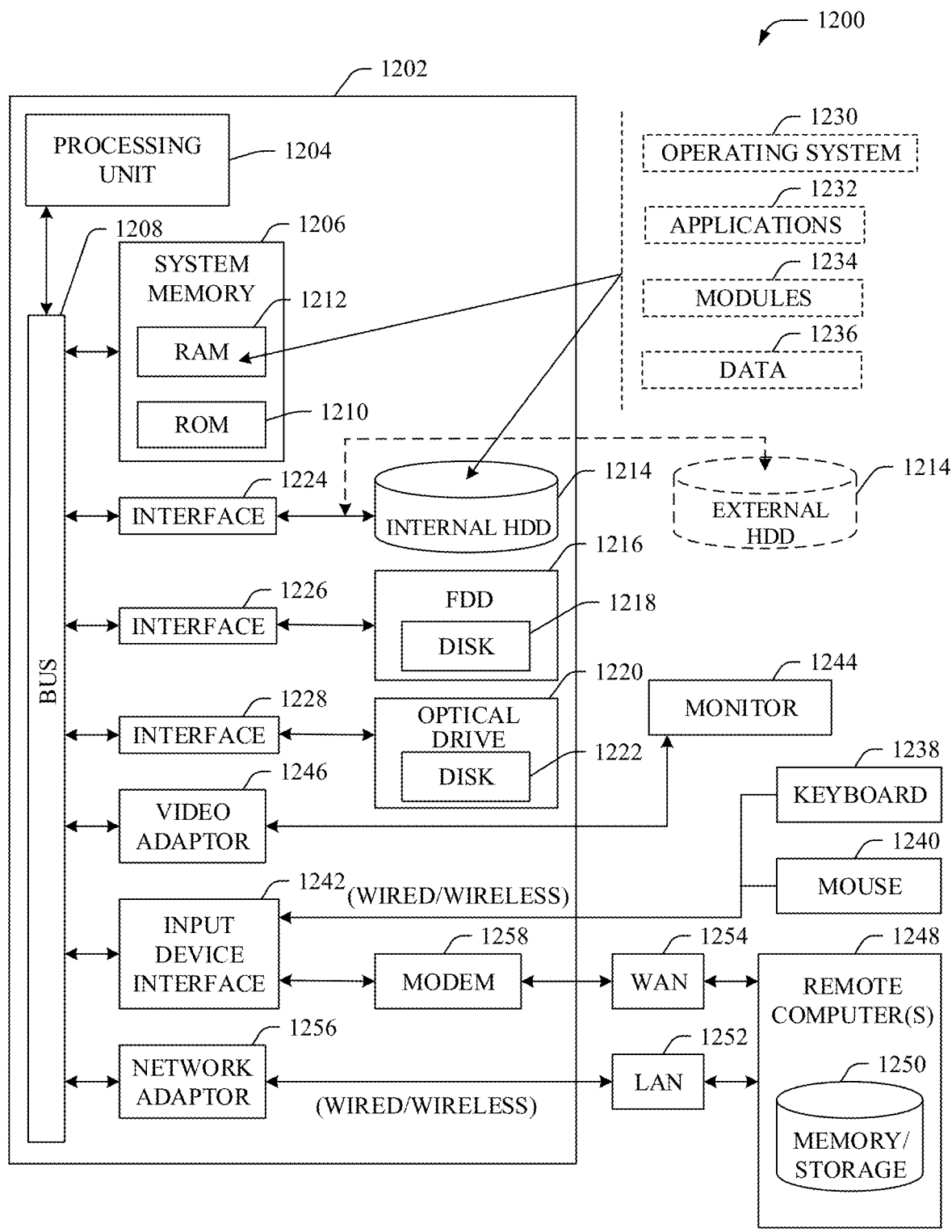
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will note that the various methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, radio frequency (RF), infrared and other wireless media.

With reference again to FIG. 12, the example environment 1200 for implementing various aspects of the specification comprises a computer 1202, the computer 1202 comprising a processing unit 1204, a system memory 1206 and a system bus 1208. As an example, the component(s), application(s), client(s), server(s), equipment, system(s), interface(s), gateway(s), controller(s), node(s), cloud(s), entity(ies), function(s), platform(s), dashboard(s), resource(s), and/or device(s) (e.g., infrastructure resources 102, SDN cloud 104, master IoT data store 106, IoT pipeline control component 108, IoT dashboard(s) 110, SDN-ized IoT gateway management component 112, IoT delivery diversification component 114, IoT gateway nodes 202, drone 204, access point 208, data store 308, communication component 310, security component 312, instruction reception component 402, route determination component 404, triggering component 406, data collection component 408, configuration component 410, gateway relocation component 412, data store 414, data forwarding component 416, data reception component 502, analysis component 504, feedback and alert reporting component 506, instruction determination component 508, AI component 602, etc.) disclosed herein with respect to systems 100-600 can each comprise at least a portion of the computer 1202. The system bus 1208 couples system components comprising, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of universal serial bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be noted by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is noted that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also comprise a wireless access point disposed thereon for communicating with the wireless adapter 1256.

When used in a WAN networking environment, the computer 1202 can comprise a modem 1258, or is connected to a communications server on the WAN 1254 or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be noted that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This comprises at least Wi-Fi and Bluetooth™ wireless technologies or other communication technologies. Thus, the communication can be a predefined structure as with a conventional network or simply an ad hoc communication between at least two devices.

Wi-Fi, or Wireless Fidelity networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be noted that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
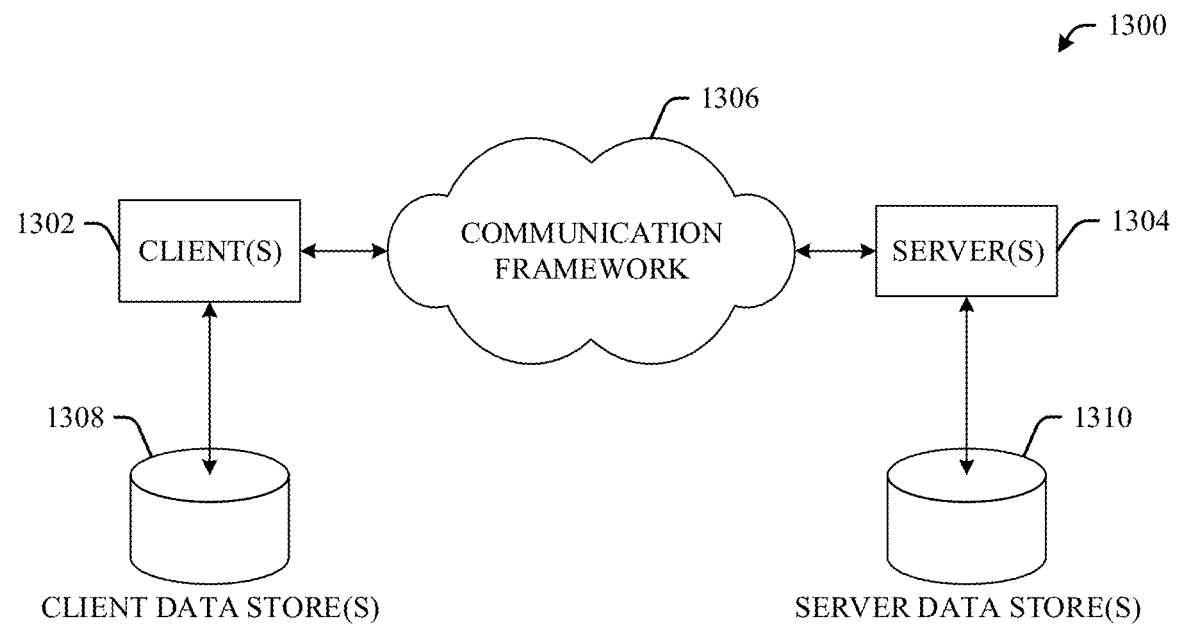
FIG. 13 illustrates a schematic block diagram of a computing environment in accordance with the subject specification.

Referring now to FIG. 13, there is illustrated a schematic block diagram of a computing environment 1300 in accordance with the subject specification. The system 1300 comprises one or more client(s) 1302. The client(s) 1302 can be hardware and/or software (e.g., threads, processes, computing devices).

The system 1300 also comprises one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may comprise a cookie and/or associated contextual information, for example. The system 1300 comprises a communication framework 1306 (e.g., a global communication network such as the Internet, cellular network, etc.) that can be employed to facilitate communications between the client(s) 1302 and the server(s) 1304.

Communications can be facilitated via a wired (comprising optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "comprises" is used in either the detailed description or the claims, such term is intended to be inclusive in a manner similar to the term "comprising" as "comprising" is interpreted when employed as a transitional word in a claim.

What is claimed is:

1. A drone device, comprising:
   a processor; and
   a memory that stores executable instructions that, when executed by the processor, facilitate performance of operations, comprising:
      facilitating moving the drone device within an area associated with an Internet of things gateway device; and
      triggering the Internet of things gateway device to facilitate a transmission of configuration data representing data used to program the Internet of things gateway device.

2. The drone device of claim 1, wherein the operations further comprise:
   receiving, from the Internet of things gateway device, measurement data captured by a sensor and communicated from the sensor to the Internet of things gateway device; and
   facilitating a transfer of the measurement data from the drone device to a software-defined networking device via a communication network, the communication network comprising a radio access network device with which the drone device is able to communicate.

3. The drone device of claim 2, wherein the measurement data is analyzed to determine an update to the configuration data.

4. The drone device of claim 2, wherein the measurement data is analyzed to determine task data indicative of a task that is to be performed by the drone device.

5. The drone device of claim 2, wherein the measurement data is analyzed to determine display data that is accessible via a user equipment.

6. The drone device of claim 2, wherein the measurement data is analyzed to determine alert data that is employable to notify a specified user equipment of an error condition.

7. The drone device of claim 1, wherein the operations further comprise:
   based on location data indicative of a geographical location of the Internet of things gateway device, determining route data indicative of a route via which the drone device is to travel.

8. The drone device of claim 7, wherein the route via which the drone device is to travel comprises flying the drone device along a path that passes near the geographical location of the Internet of things gateway device.

9. The drone device of claim 1, wherein the operations further comprise:
   receiving, from a software-defined networking device via a communication network, instruction data indicative of an instruction to relocate the Internet of things gateway device; and
   based on the instruction data, facilitating a relocation of the Internet of things gateway device.

10. The drone device of claim 1, further comprising equipment comprising wireless communications functionality.

11. A method, comprising:
facilitating, by a system comprising a processor, a routing of a drone device along a path that is within a defined distance from an Internet of things gateway device;
facilitating, by the system, a first secure communication between the drone device and the Internet of things gateway device to initiate an execution of a data collection task, wherein the execution comprises a transfer of measurement data from the Internet of things gateway device to the drone device, wherein the measurement data comprises information that has been detected via a sensor and communicated from the sensor to the Internet of things gateway device, and wherein the first secure communication comprises facilitating the first secure communication to transfer configuration data from the drone device to the Internet of things gateway device; and
facilitating, by the system, a second secure communication that transfers the measurement data from the drone device to a software-defined networking device.

12. The method of claim 11, wherein facilitating the second secure communication comprises facilitating the second secure communication to initiate an analysis of the measurement data to determine updated configuration data.

13. The method of claim 11, wherein facilitating the second secure communication comprises facilitating the second secure communication to initiate an analysis of the measurement data to determine an error condition.

14. The method of claim 11, wherein the information comprises environmental information about an environment of the sensor.

15. A non-transitory machine-readable medium, comprising executable instructions that, when executed by a processor of a device, facilitate performance of operations, comprising:
directing a drone device to fly to a location within a defined distance from a gateway device; and
facilitating a secure communication between the drone device and the gateway device to initiate an execution of a configuration task, wherein the execution comprises a transfer of configuration information to the gateway device from the drone device, and wherein the configuration information is used to program the gateway device.

16. The non-transitory machine-readable medium of claim 15, wherein the secure communication is facilitated via a broadcast protocol.

17. The non-transitory machine-readable medium of claim 15, wherein the secure communication is facilitated via a multicast protocol.

18. The non-transitory machine-readable medium of claim 15, wherein facilitating the secure communication comprises triggering the gateway device to exit a sleep mode of operation.

19. The non-transitory machine-readable medium of claim 15, wherein gateway device is deployed in an area without network coverage.

20. The non-transitory machine-readable medium of claim 15, wherein the secure communication is facilitated via a unicast protocol.

* * * * *